(12) United States Patent
Diederich, Jr. et al.

(10) Patent No.: US 7,716,904 B2
(45) Date of Patent: May 18, 2010

(54) CUTTERBAR PTO COVER AND FILLER

(75) Inventors: Anthony F. Diederich, Jr., Terre Hill, PA (US); Edward A. Blakeslee, Ephrata, PA (US); Wayne D. Thaxton, Denver, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/062,662

(22) Filed: Apr. 4, 2008

(65) Prior Publication Data
US 2009/0249757 A1  Oct. 8, 2009

(51) Int. Cl.
*A01D 75/30* (2006.01)

(52) U.S. Cl. .......................................................... 56/6

(58) Field of Classification Search .............. 56/6, 56/13.5, 13.6, 14.3, 14.5, 16.9, 17.3, 153, 56/157, 192, 235, 255, 295, 320, DIG. 21
See application file for complete search history.

(56) References Cited

U.S. PATENT DOCUMENTS

| | | | |
|---|---|---|---|
| 2,634,569 A * | 4/1953 | Raney et al. .................. 56/14.3 |
| 4,019,308 A * | 4/1977 | Quick .......................... 56/13.9 |
| 4,050,224 A * | 9/1977 | Oosterling et al. ............ 56/295 |
| 4,117,653 A | 10/1978 | Tarver, Jr. |
| 4,166,350 A | 9/1979 | Werner |
| 4,183,196 A * | 1/1980 | Oosterling et al. ............. 56/295 |
| 4,237,681 A | 12/1980 | Zantzinger, Jr. |
| 4,428,181 A * | 1/1984 | van Staveren et al. ......... 56/13.6 |
| 4,739,609 A * | 4/1988 | Meier et al. .................... 56/192 |
| 4,840,019 A | 6/1989 | Pingry |
| 4,903,468 A | 2/1990 | Haberkorn |
| 5,722,225 A * | 3/1998 | Wuebbels et al. ............... 56/60 |
| 5,768,865 A | 6/1998 | Rosenbalm et al. |
| 5,842,330 A * | 12/1998 | Richardson et al. .............. 56/6 |
| 6,581,362 B2 * | 6/2003 | Rosenbalm et al. ............... 56/6 |
| 6,718,743 B2 * | 4/2004 | Rosenbalm et al. ............... 56/6 |
| 6,718,744 B2 | 4/2004 | Rosenbalm et al. |
| 6,901,730 B1 | 6/2005 | Buresch et al. |
| 7,028,458 B2 | 4/2006 | Bruening et al. |
| 7,165,381 B2 * | 1/2007 | Rosenbalm et al. ............... 56/6 |
| 7,356,982 B2 * | 4/2008 | Barnett ........................ 56/153 |
| RE40,611 E * | 12/2008 | O'Halloran et al. ............... 56/6 |
| 2003/0110746 A1 * | 6/2003 | Rosenbalm et al. ............... 56/6 |
| 2003/0110751 A1 * | 6/2003 | Rosenbalm et al. ........... 56/16.6 |
| 2005/0126141 A1 * | 6/2005 | Eubanks et al. .................. 56/6 |
| 2005/0126142 A1 * | 6/2005 | Rosenbalm et al. ............... 56/6 |

FOREIGN PATENT DOCUMENTS

DE  4416394 A1  11/1995
FR  2757345 A1  6/1998

* cited by examiner

*Primary Examiner*—Thomas B Will
*Assistant Examiner*—Joan D Misa
(74) *Attorney, Agent, or Firm*—Patrick M. Sheldrake; John William Stader; Michael G. Harms

(57) ABSTRACT

A cutterbar drive mechanism cover for use in a specialty crop harvesting header to optimally direct severed crop material from the cutterbar to a crop conveying apparatus which then laterally converges the crop material from outboard ends of the cutting header toward an interior discharge zone for formation of a windrow or for further processing. Crop flow smoothing by the drive cover also reduces disturbances to the crop material during movement within the header which reduces seed loss in seed-bearing specialty crops.

7 Claims, 3 Drawing Sheets

US 7,716,904 B2

CUTTERBAR PTO COVER AND FILLER

BACKGROUND OF THE INVENTION

This invention relates generally to a machine for harvesting crops in a field and forming a windrow of cut crop, more particularly, to a specialized header for harvesting specialty crop with an apparatus to smooth crop flow around the cutterbar drive apparatus for efficient crop feeding into the header without damaging the crop.

In modern crop harvesting machines, it is desirable to optimize cutting headers for specific crops in order to maximize harvesting efficiency. Such optimized headers are typically based on existing headers with specific-purpose modifications incorporated to alter finite portions of the crop flow within the header to suit the specific crop. This approach helps control production costs of the equipment and extends the life cycle of a basic header design.

One specific application involves harvesting of grasses, seed or other specialty crops having seeds on a stem which must be cut and dried in a windrow a desired amount before undertaking operations to separate the seed from the stems. Care must be taken when working with such crops to minimize disturbances to the cut crop material which results in dislodgement and loss of the seeds, especially when a rotary disc cutterbar is used. A cutting header must be capable of cutting the crop from the ground and forming a windrow to allow crop drying in advance of subsequent harvesting operations. Experience has shown that changes to crop conveying and handling devices in the header are necessary to streamline crop movement in the header to reduce disturbances to the crop which result in dislodgement of the seeds from the stems.

Headers having a windrow transverse width less than the transverse cutting width of the disc cutterbar requires that the severed crop be conveyed laterally and inwardly in the header for a distance before being discharged rearwardly into the windrow. A number of devices have been created to effect the conveyance of this severed crop. In one known configuration, a drive shaft mechanism extends downwardly from the superstructure of the header to attach to one of the disc cutters and provide driving power to the cutterbar, similar to that shown in U.S. Pat. No. 5,179,822, issued on Jan. 19, 1993, to McLean, et al. Many shafts include a crop conveying drum mounted for rotation with the shaft to protect the shaft from crop entanglement and to assist with conveyance of the severed crop into the header. The positioning of this drive shaft mechanism within the normal path of crop movement results in undesirable disruption of the crop material as it is fed which is especially troublesome when specialty, seed-bearing crops are involved.

It would be desirable to provide an alternative method for smoothing and managing seed-bearing crop flow into a header which reduces the loss of seed from the crop due to interaction with the cutterbar drive mechanism while efficiently conveying severed crop material within the header toward a centrally located discharge zone for formation of a windrow that overcomes the above problems and limitations.

SUMMARY OF THE INVENTION

Accordingly, it is an object of the present invention to provide a specialty crop harvesting header which efficiently gathers severed crop from a cutterbar and conveys it to a discharge zone and there deposits the crop evenly to form a uniform windrow.

It is a further object of the present invention to provide a specialty crops header having a cover for a vertically oriented cutterbar drive mechanism that prevents crop interaction with the drive mechanism.

It is a further object of the present invention to provide a specialty crops header having a cover for a vertically oriented cutterbar drive mechanism that streamlines crop movement into the header and transverse crop auger mechanism.

It is a further object of the present invention to provide a cover for a vertically oriented cutterbar drive mechanism having a contour that feeds severed crop material into a transverse auger mechanism in the header for conveyance toward a central header discharge zone and formation of a windrow.

It is a still further object of the present invention to provide a filler cover for a vertically oriented cutterbar drive mechanism that reduces debris buildup in the upper outboard corners of the header.

It is a still further object of the present invention to provide a cover for a vertically oriented cutterbar drive mechanism that is easily incorporated into existing specialty crop header designs.

It is yet another object of the present invention to provide a cover for a vertically oriented cutterbar drive mechanism that is easily adaptable for use on a standard header designs thereby enabling efficient manufacturing of specialty headers.

It is a still further object of the present invention to provide a cover for a vertically oriented cutterbar drive that is durable in construction, inexpensive of manufacture, carefree of maintenance, easily assembled, and simple and effective to use.

These and other objects are achieved according to the instant invention by providing a cutterbar drive mechanism cover to optimally direct severed crop material from the cutterbar to a crop conveying apparatus which then laterally urges the crop material from outboard ends of the cutting header toward an interior discharge zone for formation of a windrow or for further processing. Crop flow smoothing by the drive cover also reduces disturbances to the crop material during movement within the header which reduces seed loss in seed-bearing specialty crops.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
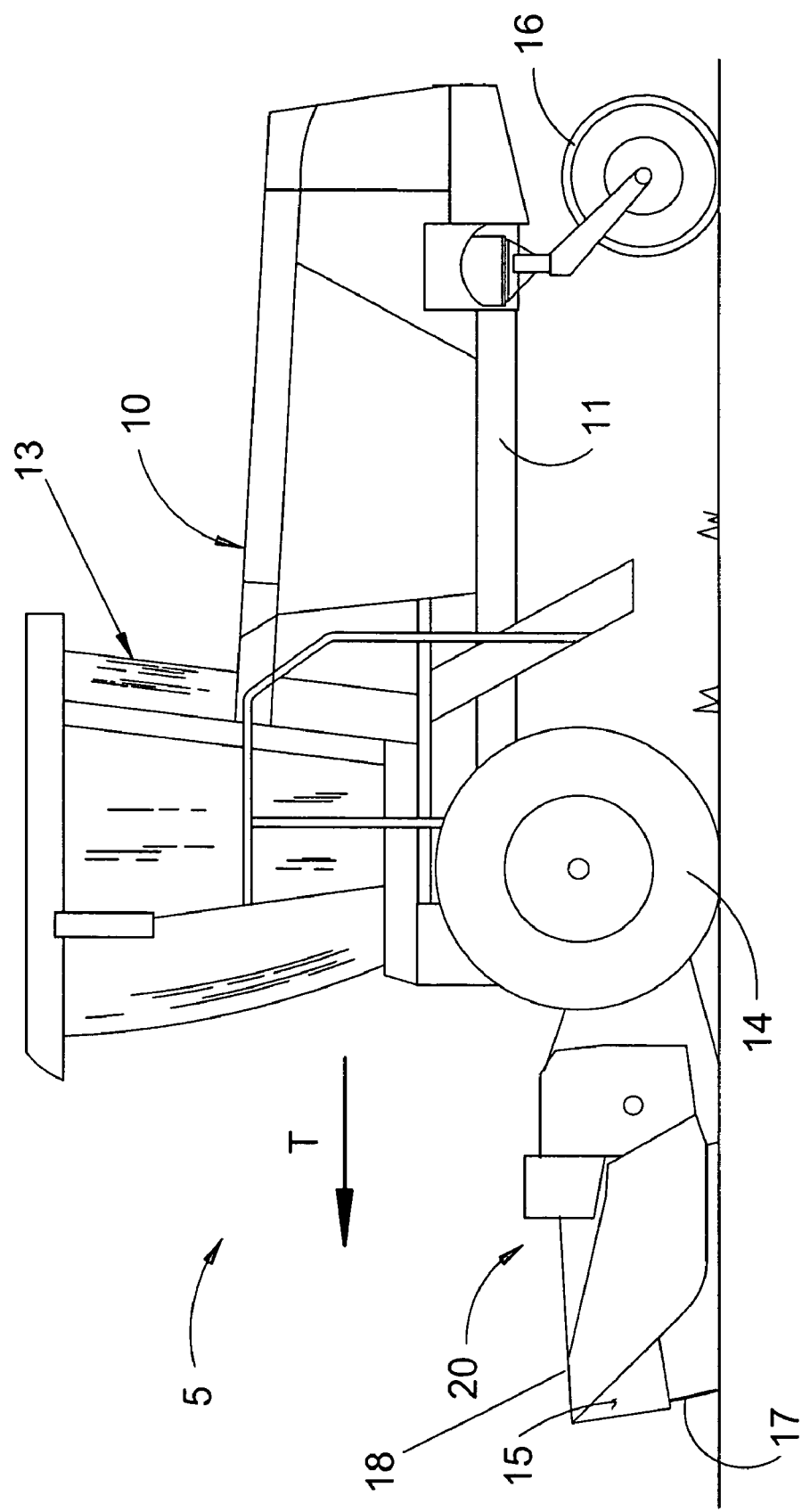
FIG. 1 is a side elevation view of a typical agricultural windrower suitable for fitment with a specialty cutting header of the type on which the present invention is useful.

FIG. 1 shows a side view of a typical self-propelled windrower 5 used for harvesting a standing crop as it travels forwardly across the ground in the direction indicated by arrow "T." Usually, a tractor 10 pushes a header 12 which severs the crop material from the ground by a sickle-bar, rotary cutter or other functionally equivalent cutting means arranged along the forward edge of the header 12. The tractor 10 has a chassis 11 for supporting various components of the windrower 5, including a set of transversely spaced-apart drive wheels 14 for propelling the windrower across the ground and at least one, and typically a pair of rear wheels 16 in the form of castors which allow the windrower to turn. There is an operator cab 13 where the operator controls the windrower operation. The crop is cut by a cutting means (not shown) in the leading edge of the header and falls rearwardly into the header. The crop material enters the header by first passing under a forward skirt 17 which is supported by extensions 15 of the header side walls. Forward skirt 17 arranges the crop for cutting and prevents debris caught up in the cutting means from being forwardly ejected from the header. Once cut, the crop material is urged toward the center of the header by a transversely arranged crop conveyance apparatus, preferably an auger. The crop is then ejected rearwardly from the header 12, generally in the space between the drive wheels 14, through a centrally positioned crop discharge zone whereupon it may be fed into a conditioning apparatus or allowed to fall to the ground and arranged in a windrow. Shields (not shown) are used to arrange the windrow into a desired uniform configuration generally trailing along the longitudinal axis of the windrower. Header 12 generally includes one or more top panels 18 covering the portion of the header. The top panels prevent debris which may become airborne through interaction with the crop cutting or conveying apparatus auger from being ejected from the header where damage or injury might result The general operation and construction of windrowers of the type on which the present invention may find utility can be found in U.S. Pat. Nos. 5,327,709, issued on Jul. 12, 1994, to Webb, U.S. Pat. No. 6,073,431, issued on Jun. 13, 2000, to Osborne et al., and U.S. Pat. No. 6,662,539, issued on Dec. 16, 2003 to Adams et al., the descriptive portions of which are incorporated herein by reference.

Figure 2:
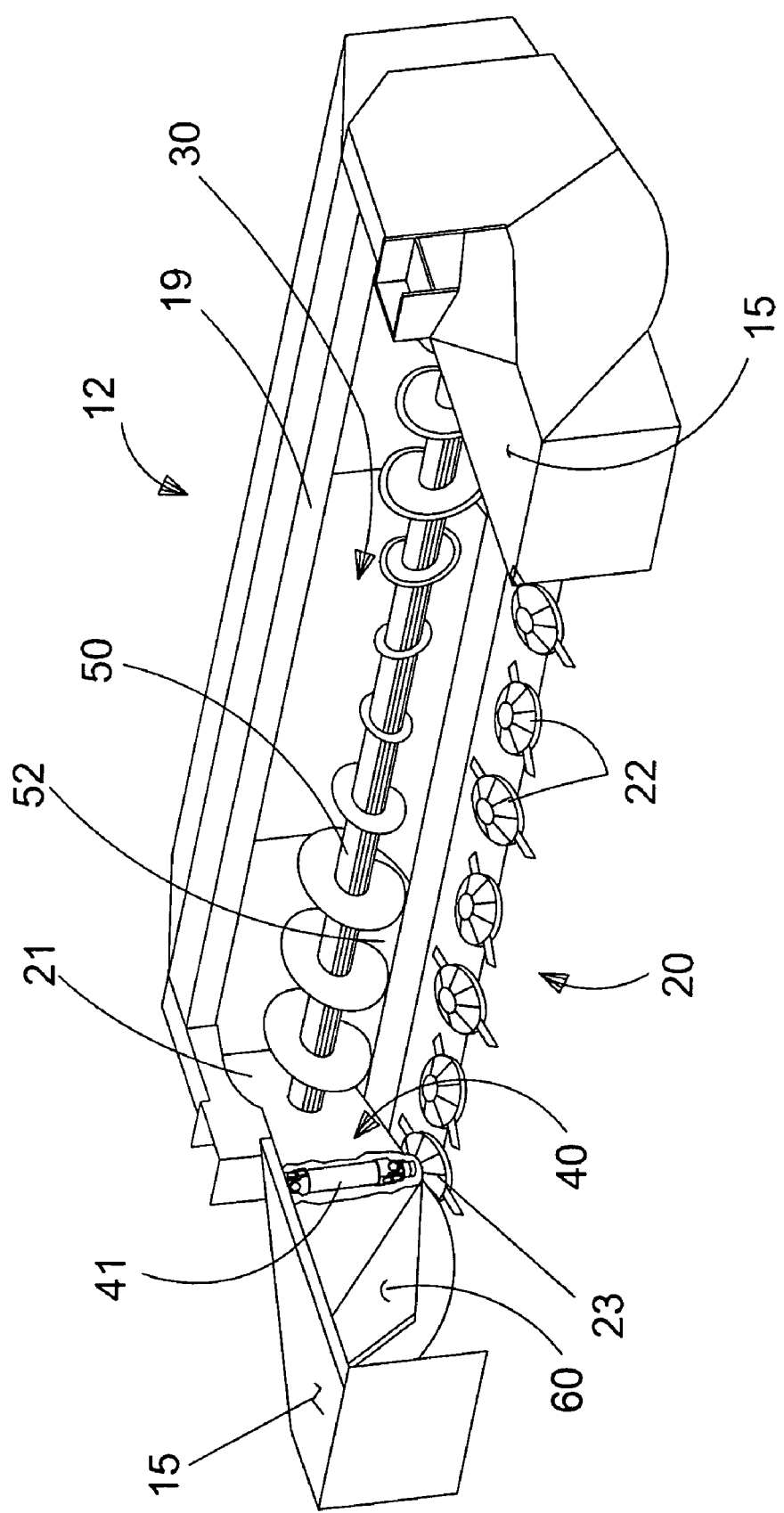
FIG. 2 is an isometric view of a cutting header incorporating a first embodiment of the present invention.

Now referring to FIG. 2, wherein a cutting header 12 is presented having generally opposing side walls 21 generally defining the header width connected by a transverse frame 19. Cutterbar 20 extends across the lower forward edge of the header 12 for substantially the entire width of the header to sever the standing crop from the field. Cutterbar 20 is powered by the prime mover by well-known means, with the final power delivery means generally being a rotating driveshaft mechanism 40 located at one end of the cutterbar 20 connected to a drive cutter 23. Wider headers may feature driveshaft mechanisms connecting to drive cutters at each end of the cutterbar. Still other headers feature cutterbars in which the drive cutter may not be the outboard rotary cutter, but additional rotary cutters are located outboard of the drive cutter. Experience with specialty crops has shown it preferable to power the cutterbar from an outboard-most drive cutter to minimize disruption of the cut crop material as it moves into the header.

While a rotary-type cutterbar is shown in FIG. 2 having a plurality of rotary cutters 22, one skilled in the art will recognize that other type of crop severing apparatus would be equally functional for harvesting a standing crop. The present invention may also provide utility when used with such alternate cutterbars having similarly configured driveshaft mechanisms in the crop movement area of the header.

A crop discharge opening 30 is provided in the rearward portion of the header allowing severed crop material to be discharged rearwardly from the header 12 to a conditioning apparatus or directly to the ground to form a windrow. As is common in modern cutting headers, the width of the cutterbar 20 is substantially greater than the width of the discharge opening 30 as the discharge opening width must be limited for feeding a conditioning apparatus or for proper windrow formation. As the severed crop material moves rearwardly into the header, a transverse crop conveyor 50 interacts with the crop material and the surrounding structure of the header, typically a trough-like structure 52 to urge the crop material toward the much narrower discharge opening 30.

Driveshaft mechanism 40 conventionally includes a feed drum co-axially connected to the shaft 41. The rotating feed drum interacts with cut crop material to urge the crop material toward the crop conveyor 50 and generally toward the centrally located discharge opening 30. However, during the harvest of certain specialty crops, especially those having stem mounted seeds, the abrupt interaction with a conventional rotating feed drum causes the seeds to be dislodged from the stems and lost from the harvested crop. Therefore, it is desirable to avoid the use of such devices in headers optimized for harvesting specialty crops. It is even more desirable to protect the cut crop material from interacting with driveshaft mechanism 40 to prevent entanglement of the crop material in the mechanism. The addition of shield panel 60 provides an effective solution that is easily implemented on a standard crop header with minimal modification. As used in the preferred embodiment, shield panel 60 replaces a conventional feed drum and streamlines crop flow into the header.

Figure 3:
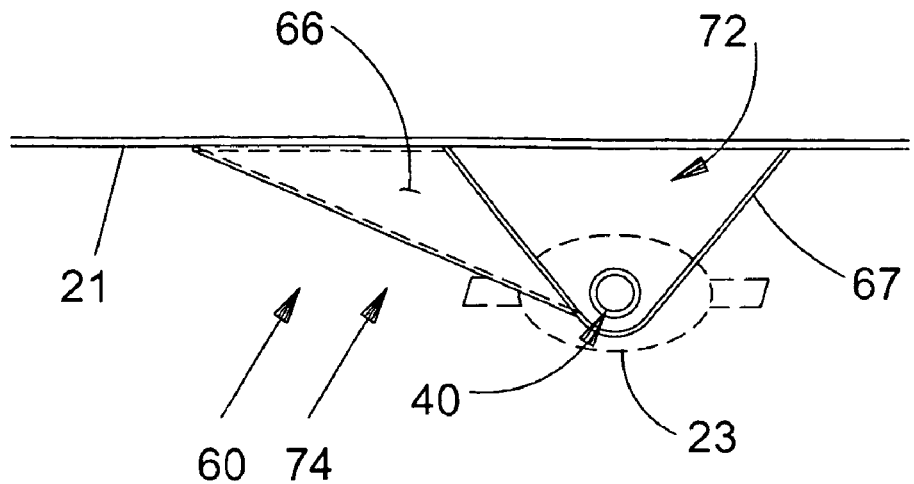
FIG. 3 is a partial plan view of the present invention showing the contour of the cover and its relationship to the cutterbar drive mechanism.
Figure 4:
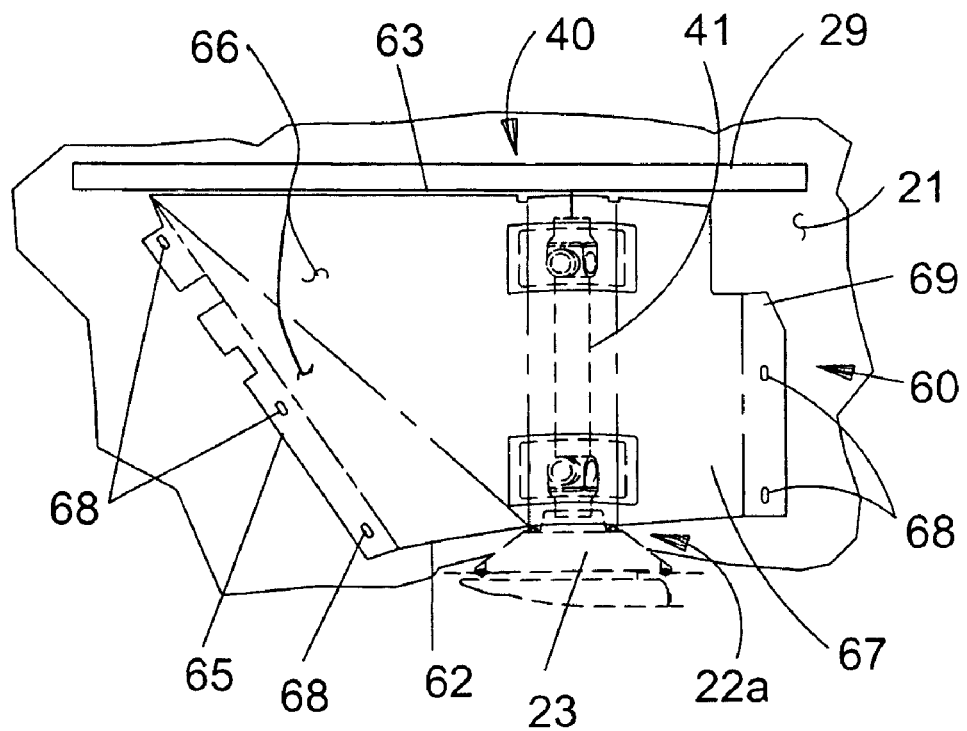
FIG. 4 is an partial elevation view of the cover, also showing its spatial relationship to the cutterbar drive mechanism.

Referring now to FIGS. 2, 3, and 4, the shield panel 60 is shown as a means to isolate the rotating driveshaft mechanism 40 from the flow of severed crop moving into the header and to direct the crop flow more smoothly into the transverse crop conveyor 50. Shield panel 60 is shaped from a flat panel, preferably sheet metal stock, into a shaped structure having a working side 74 for contact with the crop material and an opposing non-working side 72 which is adjacent to the driveshaft mechanism 40. The shaping of guide panel 60 creates guide surfaces 66, 67 to direct crop from the side wall 21 surface inwardly (with respect to the header) around the driveshaft mechanism. Shield panel 60 is bounded by top edge 63 which is positioned adjacent to the top structure of the header and extends upwardly sufficiently close to the header top cover panel 29 to prevent crop material from passing through the space. Shield panel 60 is bounded at the lower end by bottom edge 62. Bottom edge 62 is positioned sufficiently close to the top of rotary cutter 22 to prevent entanglement of crop where the driveshaft meets the cutter, shown at shaft connection 22a. Shield panel 60 also features a leading end 65 and a trailing end 69, each end having a plurality of attachment apertures 68 that allow shield panel 60 to be secured to side wall 21 by screws, rivets, or any other functionally equivalent fastening means capable of maintaining the shield panel in position. Use of removable fasteners allows the shield panel to be removed to provide access to the driveshaft mechanism 40 for maintenance or repair activity.

Streamlining the crop flow into the header, particularly in the area between the cutterbar and the transverse auger 50, reduces the disruption of the crop, which when specialty, seed-bearing crop are involved, reduces the amount of seed loss during the windrowing operation. In addition, by directing crop flow more smoothly into the auger, shield panel 60 also reduces collection of crop and debris in the outboard interior corners of the header where engagement by the auger is not as effective.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A specialty crop harvesting header for seed bearing crop for
   longitudinal forward movement across a field of standing crop comprising
   an elongate front opening oriented generally transverse to the direction of forward movement;
   a rotary cutterbar disposed along a forward-facing bottom edge of the front opening for severing the standing crop from the ground, the rotary cutterbar having a plurality of rotary cutters and at least one drive cutter, said at least one drive cutter being positioned at an end of said cutterbar;
   a drive mechanism to direct drive power to the cutterbar for operation thereof, said drive mechanism having a drive device being connected to said at least one drive cutter through a vertically-oriented exposed rotating shaft spanning between the drive device and drive cutter;
   the specialty crop header not including a rotatable drum around a portion of the shaft above the cutterbar; and
   a shield for enclosing said shaft and directing crop around the shaft of the drive mechanism towards said front opening, the shield extending in a lateral direction from the sidewall past the shaft and sloped rearward with respect to the direction of forward movement of the header, and wherein the bottom edge of the shield directly forward of the shaft is adjacent to a top edge of the at least one drive cutter.

2. The header of claim 1, wherein said shield further comprising a plurality of apertures for receiving a plurality of removable fasteners thereby enabling said shield panel to be selectively connected to the header.

3. The specialty crop harvesting header of claim 1, wherein a forward wall along the bottom edge of the shield is downwardly and rearwardly sloped for reducing the disruption of the crop during mowing.

4. In a crop harvesting machine having a ground supported chassis for forward movement of a cutting header across the ground, the header having generally opposing side walls defining a width therebetween, a cutterbar transversely disposed along a forward-facing bottom edge of the header for severing a standing crop from the ground, a drive mechanism for powering the cutterbar, the drive mechanism including a vertically-oriented shaft having a rotational axis located adjacent to at least one of the side walls and connected to the cutterbar to direct drive power to the cutterbar for operation thereof, a rearward discharge for depositing cut crop material on the ground in a windrow, the rearward discharge having a width substantially less than the header width, and a transversely arranged converging apparatus for conveying cut crop material from the cutterbar to the discharge opening, the improvement comprising:
   wherein the crop harvesting machine is configured for mowing seed crop such that the vertically oriented shaft, extending between the side walls of the header, does not pass through a rotating feed drum near the connection of the drive mechanism to the shaft; and
   a shield for directing cut crop material around the vertically-oriented shaft toward the converging apparatus, said shield having a connection to one of the header side walls, and shaped to substantially enclose the portion of the vertically oriented shaft extending above the cutterbar in a space between a non-working surface of the shield and the side wall, a bottom edge of the shield is positioned adjacent to the cutterbar at a position directly forward of the shaft with respect to the direction of forward movement and a forward wall of the shield along the bottom edge is downwardly and rearwardly sloped with respect to the direction of movement for reducing the disruption of the crop during mowing.

5. The improvement of claim 4, further comprising a leading end and a trailing end, said loading end and trailing end being connected to the side wall at first and second mounting positions, respectively.

6. The improvement of claim 5, further comprising a plurality of apertures in each of said leading end and said trailing end, said plurality of apertures for receiving a plurality of removable fasteners thereby enabling said shield panel to be selectively connected to the side wall.

7. The improvement of claim 4, wherein the cutterbar comprises a plurality of rotary cutters.

\* \* \* \* \*